Dec. 11, 1951     C. P. FORSBERG     2,578,532
FISH LURE
Filed Sept. 7, 1950
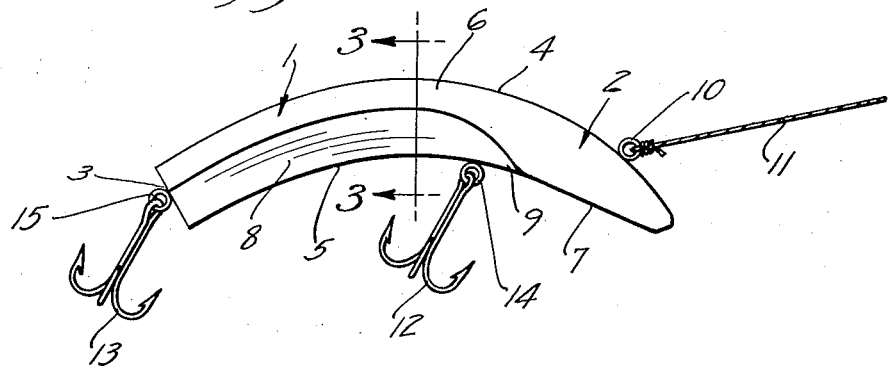
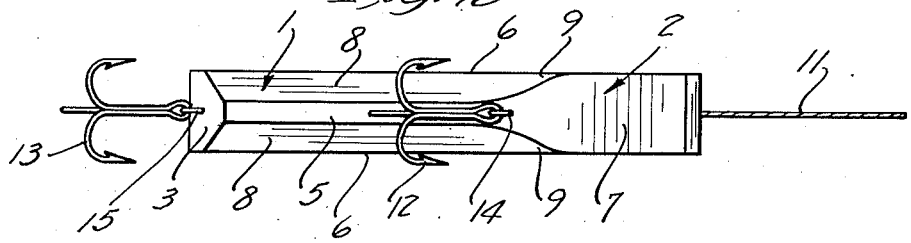
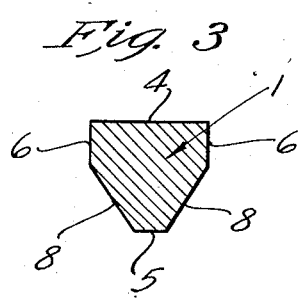
Inventor
Clarence P. Forsberg
By his Attorneys
Merchant & Merchant Patented Dec. 11, 1951

2,578,532

UNITED STATES PATENT OFFICE 2,578,532

FISH LURE

Clarence P. Forsberg, Brainerd, Minn.

Application September 7, 1950, Serial No. 183,599

1 Claim. (Cl. 43—42.48)

My invention relates to subsurface fish baits of the so-called plug type.

The primary object of my invention is the provision of a plug-type bait which will oscillate or gently roll from side to side, so as to be most effective as a fish lure.

A still further object of my invention is the provision of a lure which will not cause any violent commotion in the water and which will closely simulate the smooth swimming action of a fish.

A still further object of my invention is the provision of a device which is light in weight, and which can be manufactured and shipped at a minimum of cost.

The above and still further objects of my invention will become apparent from the following detailed specification, appended claim, and attached drawings.

Referring to the drawings, which illustrate the invention, and in which like characters indicate like parts throughout the several views:

Fig. 1 is a view in side elevation of a plug-type fish lure made in accordance with my invention;

Fig. 2 is a view in bottom plan of my novel fish lure; and

Fig. 3 is an enlarged transverse section taken substantially on the line 3—3 of Fig. 1.

Referring with greater detail to the drawings, the numeral 1 indicates a generally elongated arcuate body formed at one end to provide a head 2 and at its other end to provide a rear end or tail portion 3. The body 1 is formed with a transversely flat top surface 4, a transversely flat bottom surface 5, and substantially parallel side-forming surfaces 6 which extend substantially the length of the body. The bottom surface 5, rearwardly of the head 2, is substantially concentric to the top surface 4 thereof, the bottom surface of the head portion 2 being flat as indicated at 7 and converging forwardly with the top surface thereof whereby to form a generally forward taper to the head 2. The body 1, rearwardly of the head 2, is formed to provide beveled surfaces 8 which extend longitudinally from the head 2 to the tail portion 3 and converge toward the bottom surface 5 of the body 1. It will be noted by reference to Figs. 1 and 2 that the beveled surfaces 8 at their forward end portions gradually diminish toward the bottom and sides of the head 2 as indicated at 9.

Line attachment means in the nature of an eyelet or the like 10 is secured to the top wall of the head 2 in any suitable manner for attachment thereto of a leader or fish line 11. Hook elements in the nature of treble hooks 12 and 13 are attached, the former to the bottom surface portion of the body 1 immediately behind the head 2, and the latter to the extreme rear end or tail portion 3 of the body 1. The hook elements 12 and 13 are secured for swinging movements with respect to the body 1 by means of conventional eyelets or the like 14 and 15 respectively.

When my novel fish lure is drawn through the water, its arcuate shape tends to cause the head portion 2 to descend below the level of the body rearwardly thereof, thus raising the rear end portion of the body 1 above the line of draft of the fish line 11, making the lure unstable as to balance and cause the same to wobble or oscillate from side to side in the water. The body 1, being beveled as at 8, is lighter in weight than the head 2, offers less resistance to the water and therefore enhances the above-mentioned wobbling or oscillating action. I have found by test that a lure of this particular shape creates a very life-like imitation of a fish swimming through the water.

My improved plug-type lure may be made from any suitable material such as wood, synthetic resins, and the like, and may be made with various color combinations to resemble different species of fish.

My invention has been thoroughly tested and found to be completely satisfactory for the accomplishment of the objectives set forth; and, while I have shown and described a preferred embodiment of my improved fish lure, it should be understood that the same is capable of modification without departure from the spirit and scope of the invention as defined in the claim.

What I claim is:

In a device of the class described, a generally elongated plug-type body having substantially parallel side-forming surfaces which extend from the front to the rear end thereof, a substantially flat arcuate top surface on said body, a bottom surface portion on the front end of said body which converges with respect to said top surface and therewith defines a forwardly-tapering head, a bottom surface portion on said body rearwardly of said head concentric with the top surface thereof, longitudinally-extended bevelled portions connecting the bottom and side-forming portions and extending intermediate the head and the rear end of said body, and line attachment means on the arcuate upper surface of said body intermediate the front and rear end portions of said head.

CLARENCE P. FORSBERG.

REFERENCES CITED

The following references are of record in the file of this patent:

UNITED STATES PATENTS

| Number | Name | Date |
|---|---|---|
| D. 158,349 | Wiinikka | Apr. 25, 1950 |
| 1,537,261 | Pflueger | May 12, 1925 |
| 1,558,470 | Gibson | Oct. 27, 1925 |
| 1,745,006 | Chapleau | Jan. 28, 1930 |
| 1,894,500 | Sweeney | Jan. 17, 1933 |
| 2,183,849 | Swanberg | Dec. 19, 1939 |